(12) United States Patent
Miura (10) Patent No.: US 7,329,432 B2
(45) Date of Patent: *Feb. 12, 2008

(54) METHOD FOR MANUFACTURING FUEL CELL, AND ELECTRONIC DEVICE AND AUTOMOBILE INCLUDING THE FUEL CELL

(75) Inventor: Hirotsuna Miura, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 557 days.

This patent is subject to a terminal disclaimer.

(21) Appl. No.: 10/791,719

(22) Filed: Mar. 4, 2004

(65) Prior Publication Data

US 2004/0229105 A1    Nov. 18, 2004

(30) Foreign Application Priority Data

Mar. 5, 2003    (JP) .............................. 2003-058743

(51) Int. Cl.
*H01M 8/02*    (2006.01)
(52) U.S. Cl. ........................................ 427/115; 429/39
(58) Field of Classification Search ...................... None
See application file for complete search history.

(56) References Cited

U.S. PATENT DOCUMENTS

| | | | |
|---|---|---|---|
| 5,798,188 A * | 8/1998 | Mukohyama et al. | 429/34 |
| 6,472,094 B1 * | 10/2002 | Nonoyama et al. | 429/34 |
| 6,761,990 B1 | 7/2004 | Yoshitake et al. | |
| 2003/0013602 A1 | 1/2003 | Uchida et al. | |
| 2004/0209152 A1 * | 10/2004 | Yamada et al. | 429/38 |
| 2004/0213902 A1 * | 10/2004 | Ajiki et al. | 427/115 |

FOREIGN PATENT DOCUMENTS

| | | |
|---|---|---|
| JP | A-10-255823 | 9/1998 |
| JP | A-2000-294257 | 10/2000 |
| JP | A 2001-113141 | 4/2001 |
| KR | A 2003-0011765 | 2/2003 |
| WO | WO 00/44059 A | 7/2000 |

OTHER PUBLICATIONS

Lee et al.; "Factorial Design Study of Miniature Fuel Cells with Micromachined Silicon Flow Structures"; The 200th Meeting of the Electrochemical Society; Abstract No. 452; 2001.
Chang-Chien et al.; "Planar Interconnection of Multiple Polymer Electrolyte Membrane Fuel Cells by Microfabrication"; The 200th Meeting of the Electrochemical Society; Abstract No. 453; 2001.

* cited by examiner

Primary Examiner—Jonathan Crepeau
(74) Attorney, Agent, or Firm—Oliff & Berridge, PLC (57) ABSTRACT

The invention provides a low-cost, simple, and efficient method of manufacturing a fuel cell having any pattern, and an electronic device and automobile including the fuel cell as a power supply. A method for manufacturing a fuel cell includes: defining first gas channels on a first substrate; forming a first current-collecting layer; forming a first reacting layer; forming an electrolyte membrane; defining second gas channels on a second substrate; forming a second current-collecting layer; and forming a second reacting layer. In at least one of the defining of the first gas channels and the defining of the second gas channels, the gas channels are defined by applying a gas channel defining material using a discharger on the substrate. A fuel cell manufactured by this method is included in an electronic device or automobile as a power supply.

4 Claims, 9 Drawing Sheets

METHOD FOR MANUFACTURING FUEL CELL, AND ELECTRONIC DEVICE AND AUTOMOBILE INCLUDING THE FUEL CELL

BACKGROUND OF THE INVENTION

1. Field of Invention

The present invention relates to a method of manufacturing a fuel cell in which different reactive gases are externally supplied to individual electrodes and are reacted to produce electricity. The invention also relates to an electronic device and an automobile including the fuel cell manufactured according to the method.

2. Description of Related Art

Related art fuel cells include, for example, an electrolyte membrane, an electrode (anode) having a reacting layer on a surface of the electrolyte membrane, and another electrode (cathode) having another reacting layer made of, for example, platinum microparticles on the other surface of the electrolyte membrane. Among such fuel cells, for example, solid polymer electrolyte fuel cells use a solid polymer electrolyte membrane. On the anode side of a polymer electrolyte fuel cell, hydrogen splits into hydrogen ions and electrons. These electrons are conducted to the cathode side while the hydrogen ions travel through the electrolyte membrane to the cathode side. On the cathode side, the hydrogen ions combine with oxygen gas and the electrons to form water.

In the related art, micro fuel cells have been researched and developed for use in, for example, mobile devices. The micro fuel cells have been manufactured by microelectromechanical systems (MEMSs), which are based on micromachining technology in, for example, semiconductor processes. An example of such methods includes patterning a resist resin on a substrate, etching any part except the pattern to form gas channels, and removing the resist resin (see Sang-Joon J. Lee, Suk Won Cha, Amy Chang-Chien, Ryan O'Hayre, and Fritz B. Prinz, Factorial Design Study of Miniature Fuel Cells with Micromachined Silicon Flow Structures, The 200th Meeting of The Electrochemical Society, Abstract No. 452 (2001), and Amy Chang-Chien, Suk Won Cha, Sang-Joon J. Lee, Ryan O'Hayre, and Fritz B. Prinz, Planar Interconnection of Multiple Polymer Electrolyte Membrane Fuel Cells by Microfabrication, The 200th Meeting of The Electrochemical Society, Abstract No. 453 (2001)).

SUMMARY OF THE INVENTION

An expensive device is required to form gas channels on a substrate using technologies, such as MEMSs for semiconductor processes. In addition, such technologies unfortunately involve a complicated manufacturing process that includes patterning a resist resin, etching a substrate, and removing the resist resin.

In order to address or solve the above, the present invention provides a low-cost, simple, and efficient method of manufacturing a fuel cell including gas channels having any pattern. The present invention further provides an electronic device and an automobile including this fuel cell as a power supply.

In accordance with the invention, gas channels having any pattern can be easily and efficiently defined by applying a gas channel defining material onto a substrate using an inkjet discharger (hereinafter "discharger").

According to a first aspect of the present invention, a method of manufacturing a fuel cell includes: defining first gas channels to supply a first reactive gas on a first substrate; forming a first current-collecting layer to collect electrons generated through a reaction of the first reactive gas supplied through the first gas channels; forming a first reacting layer to catalyze the first reactive gas supplied through the first gas channels; forming an electrolyte membrane; defining second gas channels to supply a second reactive gas on a second substrate; forming a second current-collecting layer to supply the electrons for a reaction of the second reactive gas supplied through the second gas channels; and forming a second reacting layer to catalyze the second reactive gas supplied through the second gas channels. In at least one of the defining of the first gas channels and the defining of the second gas channels, the gas channels are defined by gas channel defining layers made of coatings formed by applying a first gas channel defining material onto the first substrate and/or the second substrate using a discharger.

In at least one of the defining of the first gas channels and the defining of the second gas channels, the coatings are preferably formed by repeatedly applying the first gas channel defining material using the discharger at regular intervals over areas onto which the gas channel defining layers are formed.

In at least one of the defining of the first gas channels and the defining of the second gas channels, preferably, after the coatings are formed by repeatedly applying the first gas channel defining material using the discharger at regular intervals over areas onto which the gas channel defining layers are formed, the coatings are further coated with a second gas channel defining material having a lower viscosity than the first gas channel defining material.

In this method, a thermosetting resin or a photocurable resin is preferably used as the first gas channel defining material and/or the second gas channel defining material.

According to a second aspect of the present invention, a fuel cell manufactured by the manufacturing method of the present invention is included in an electronic device as a power supply.

According to a third aspect of the present invention, a fuel cell manufactured by the manufacturing method of the present invention is included in an automobile as a power supply.

According to the manufacturing method of the present invention, gas channels having any pattern can be easily defined on a substrate with simple operation. In addition, a required amount of gas channel defining material can be precisely and efficiently applied over predetermined areas using a discharger to define gas channels.

According to the manufacturing method of the present invention, gas channels having a uniform height along their whole length can be efficiently defined by repeatedly applying the gas channel defining material at regular intervals using the discharger.

According to the manufacturing method of the present invention, in at least one of the defining of the first gas channels and the defining of the second gas channels, after the coatings are formed by repeatedly applying the first gas channel defining material using the discharger at regular intervals over areas onto which the gas channel defining layers are formed, the top surfaces of the coatings of the first gas channel defining material may be further coated with the second gas channel defining material having a lower viscosity than the first gas channel defining material to finish these top surfaces. Thus, gas channels having a uniform height along their whole length can be efficiently defined.

According to the manufacturing method of the present invention, a fuel cell including gas channels having desired patterns can be efficiently manufactured at low cost using a thermosetting resin or a photocurable resin, either of which is inexpensive and can be easily cured by heating or light irradiation, as the first gas channel defining material and/or the second gas channel defining material.

The electronic device according to the present invention includes a fuel cell manufactured by the manufacturing method of the present invention as a power supply. This electronic device, therefore, can use environmentally friendly clean energy as a power supply.

The automobile according to the present invention includes a fuel cell manufactured by the manufacturing method of the present invention as a power supply. This automobile, therefore, can use environmentally friendly clean energy as a power supply.

DETAILED DESCRIPTION OF PREFERRED EMBODIMENTS

A method of manufacturing a fuel cell, and an electronic device and an automobile including a fuel cell manufactured by this method is described below in detail according to the present invention.

According to the present invention, the method of manufacturing a fuel cell includes: defining first gas channels to supply a first reactive gas on a first substrate; forming a first current-collecting layer; forming a first reacting layer to catalyze the first reactive gas; forming an electrolyte membrane; defining second gas channels to supply a second reactive gas on a second substrate; forming a second current-collecting layer; and forming a second reacting layer to catalyze the second reactive gas.

Figure 1:
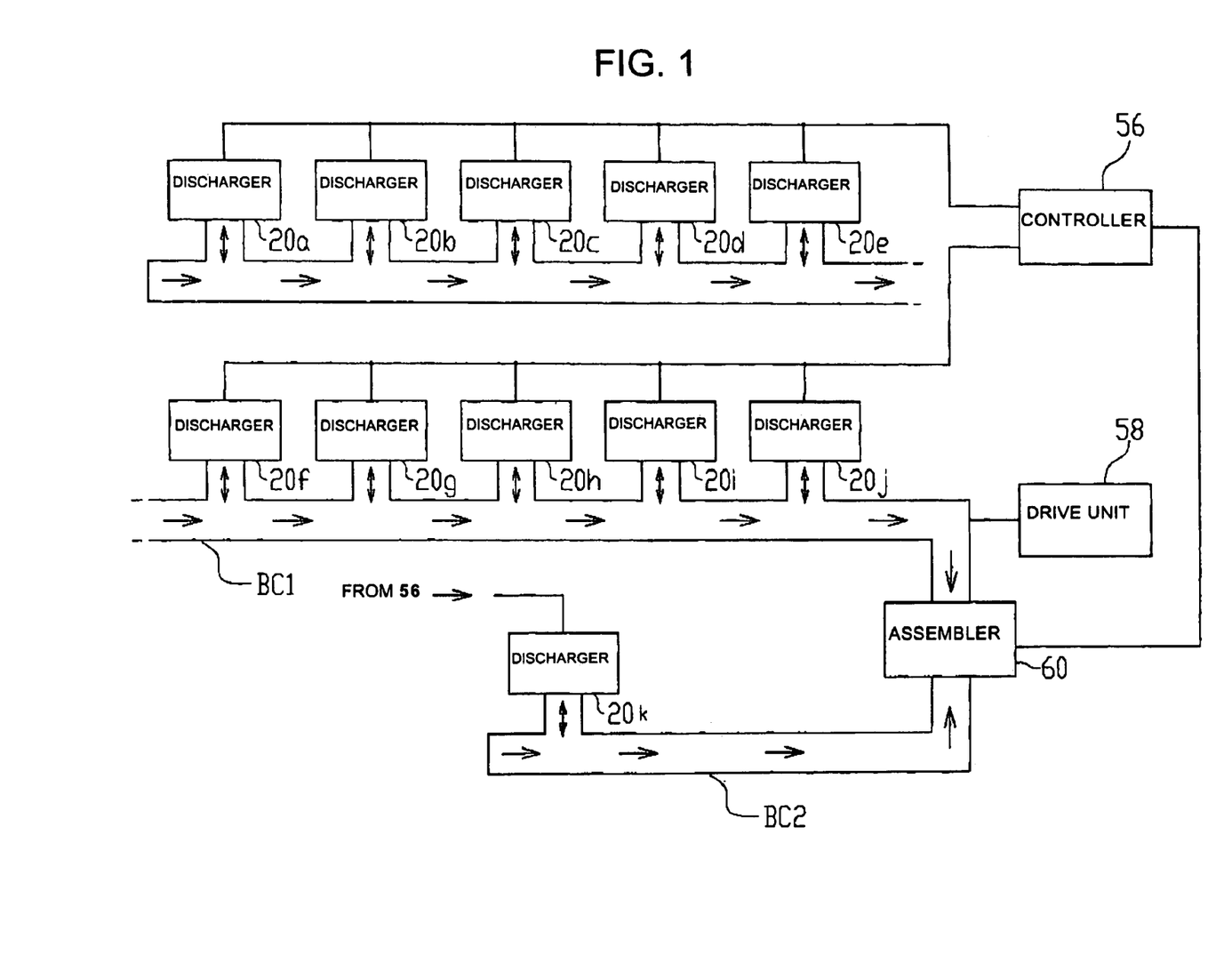
FIG. 1 is a schematic that shows a fuel cell manufacturing line according to an exemplary embodiment.

This method may be performed with fuel cell manufacturing equipment (a fuel cell manufacturing line) illustrated in FIG. 1. Referring to FIG. 1, this fuel cell manufacturing line includes dischargers $20a$ to $20k$ for use in individual steps, a belt conveyor BC1 linked with the dischargers $20a$ to $20j$, a belt conveyor BC2 linked with the discharger $20k$, a drive unit 58 to drive the belt conveyors BC1 and BC2, an assembler 60 to assemble a fuel cell, and a controller 56 to control the overall fuel cell manufacturing line.

The dischargers $20a$ to $20j$ are aligned along the belt conveyor BC1 at regular intervals while the discharger $20k$ is disposed at a predetermined position along the belt conveyor BC2. The controller 56 is connected to the dischargers $20a$ to $20k$, the drive unit 58, and the assembler 60.

On this fuel cell manufacturing line, the drive unit 58 drives the belt conveyor BC1 to convey a fuel cell substrate (hereinafter "substrate") to the dischargers $20a$ to $20j$, which sequentially process this substrate. In response to a control signal from the controller 56, similarly, the drive unit 58 drives the belt conveyor BC2 to convey another substrate to the discharger $20k$, which processes this substrate. The belt conveyors BC1 and BC2 then convey these substrates to the assembler 60. The assembler 60, in response to a control signal from the controller 56, assembles the substrates into a fuel cell.

The dischargers $20a$ to $20k$ are inkjet dischargers, which are not particularly limited. Examples of the inkjet dischargers include thermal inkjet dischargers, which discharge droplets with bubbles caused by heating, and piezo inkjet dischargers, which discharge droplets with pressure caused by a piezo element.

Figure 2:
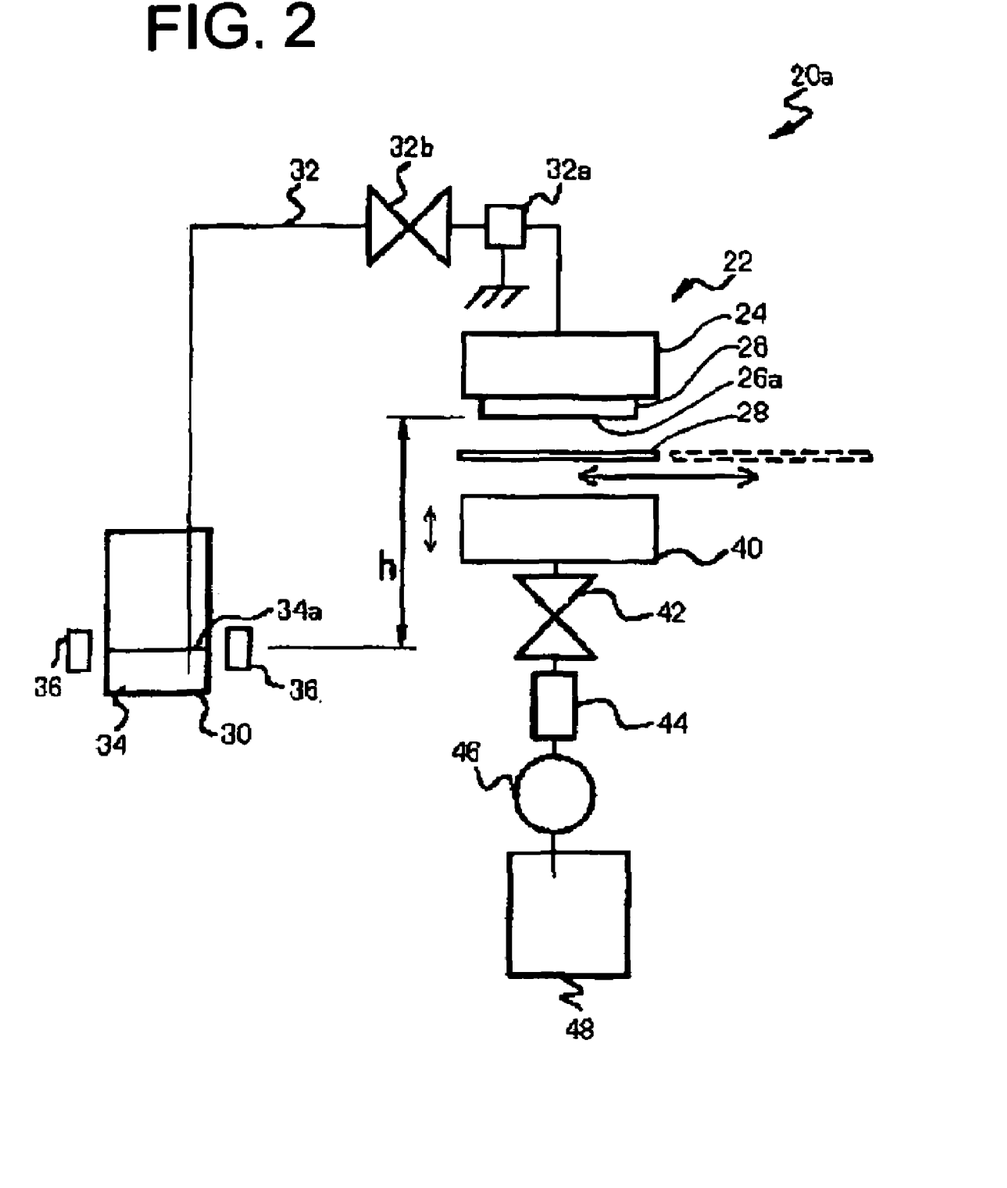
FIG. 2 is a schematic of an inkjet discharger according to this exemplary embodiment.

FIG. 2 illustrates the discharger $20a$ in this exemplary embodiment. This discharger $20a$ includes a tank 30 to store a discharging liquid 34, an inkjet head 22 linked to the tank 30 through a carrier pipe 32 to feed the discharging liquid 34, a table 28 to hold and convey a coated substrate, a suction cap 40 to suction and remove a residue of the discharging liquid 34 from the inkjet head 22, and an effluent tank 48 to collect the residue suctioned by the suction cap 40.

The tank 30 stores the discharging liquid 34, which is, for example, a gas channel defining material, and has a liquid level control sensor 36 to control a liquid level $34a$ of the discharging liquid 34 in the tank 30. This liquid level control sensor 36 maintains a height difference h (hereinafter "waterhead value") between an end $26a$ of a nozzle-formed portion 26 of the inkjet head 22 and the liquid level $34a$ in the tank 30 within a predetermined range. For example, the discharging liquid 34 can be fed into the inkjet head 22 with a pressure within a predetermined range by controlling the liquid level $34a$ to maintain the waterhead value within 25 m±0.5 mm. Such a pressure allows the inkjet head 22 to discharge a required amount of discharging liquid 34 stably.

The carrier pipe 32 to feed the discharging liquid 34 has an earth joint 32a and a valve 32b. The earth joint 32a reduces or prevents an electrical charge in the passage of the carrier pipe 32. The valve 32b is used when the suction cap 40 as described below suctions the discharging liquid 34 in the inkjet head 22.

The inkjet head 22 includes a head body 24 and the nozzle-formed portion 26 having many nozzles to discharge the discharging liquid 34. These nozzles on the nozzle-formed portion 26 apply, for example, the gas channel defining material onto the substrate to define the gas channels for supplying the reactive gas on the substrate.

The table 28 is movable in a predetermined direction. This table 28 moves in a direction indicated by an arrow shown in FIG. 2 to hold the substrate conveyed by the belt conveyor BC1 and to introduce the substrate into the discharger 20a.

The suction cap 40 is movable in a direction indicated by another arrow shown in FIG. 2. This suction cap 40 contacts the nozzle-formed portion 26 to surround the nozzles on the nozzle-formed portion 26. The suction cap 40 can thereby seal the nozzles in a space between the suction cap 40 and the nozzle-formed portion 26 to keep the nozzles away from outside air. The suction cap 40 suctions the discharging liquid 34 in the inkjet head 22 while the valve 32b closes the passage of the carrier pipe 32. The suction cap 40, therefore, can suction the discharging liquid 34 at a faster rate to exclude bubbles from the inkjet head 22 more quickly.

The suction cap 40 has a passage extending below. This passage has a suction valve 42, a suction pressure sensor 44, a suction pump 46, and the effluent tank 48. The suction valve 42 closes the passage to reduce the time required to balance a pressure on the suction side below the suction valve 42 and a pressure on the head side above the suction valve 42 (to the atmospheric pressure). The suction pressure sensor 44 detects abnormal suction. The suction pump 46, which is composed of, for example, a tube pump, suctions and conveys the discharging liquid 34, which is temporarily collected into the effluent tank 48.

In this exemplary embodiment, though the dischargers 20a to 20k process different discharging liquids 34, the dischargers 20b to 20k are similar to the discharger 20a. Therefore, similar components in these dischargers 20a to 20k are hereinafter indicated by the same reference numerals.

Figure 3:
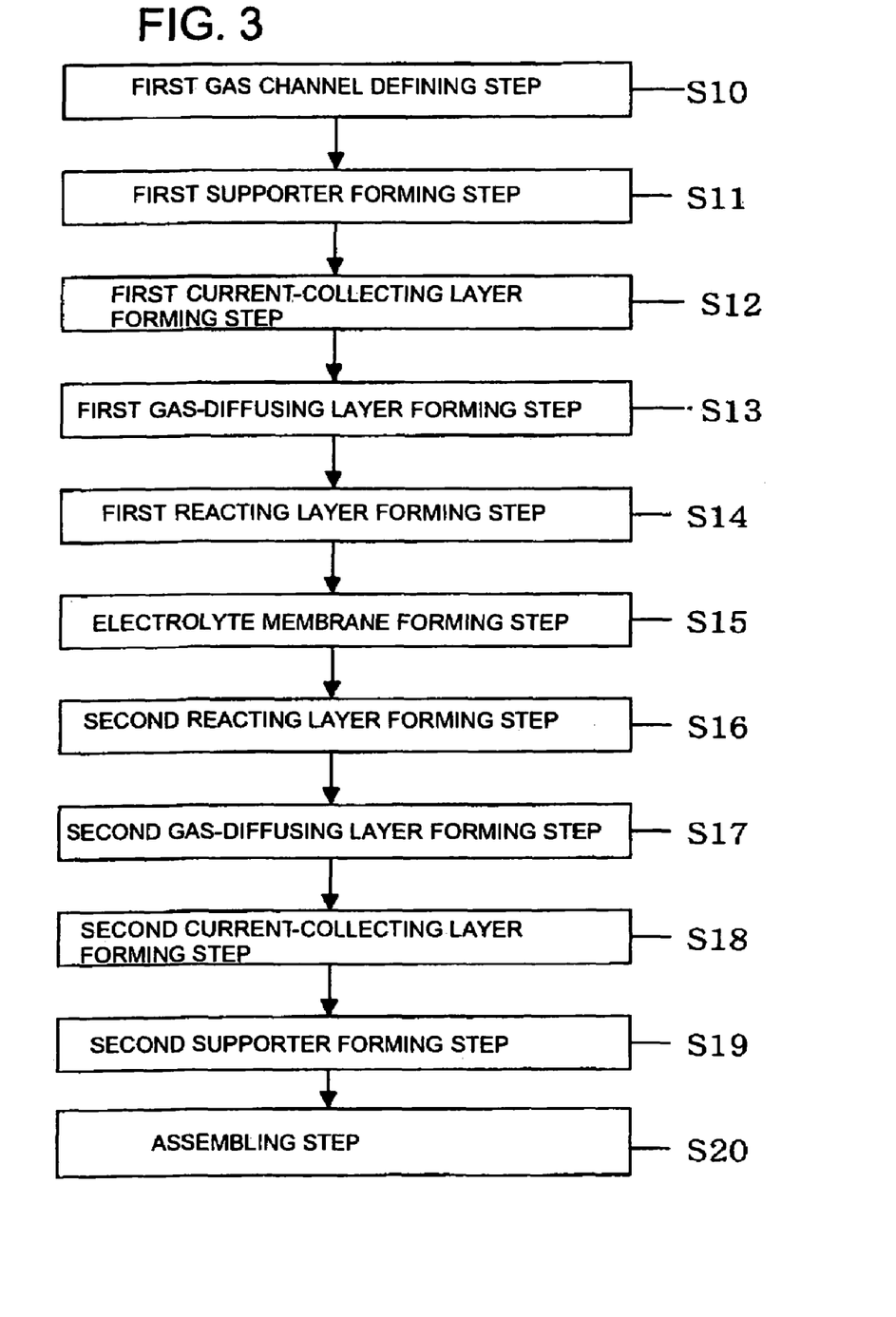
FIG. 3 is a flow chart of a method of manufacturing a fuel cell according to this exemplary embodiment.

The individual steps of the method of manufacturing a fuel cell on the fuel cell manufacturing line in FIG. 1 are described below. FIG. 3 is a flow chart of the method for manufacturing a fuel cell on the fuel cell manufacturing line in FIG. 1.

Referring to FIG. 3, according to the present invention, the method of manufacturing a fuel cell includes: defining the first gas channels on the first substrate (S10, a first gas channel defining step); forming first supporters in the first gas channels (S11, a first supporter forming step); forming the first current-collecting layer (S12, a first current-collecting layer forming step); forming a first gas-diffusing layer (S13, a first gas-diffusing layer forming step); forming the first reacting layer (S14, a first reacting layer forming step); forming the electrolyte membrane (S15, an electrolyte membrane forming step); forming the second reacting layer (S16, a second reacting layer forming step); forming a second gas-diffusing layer (S17, a second gas-diffusing layer forming step); forming the second current-collecting layer (S18, a second current-collecting layer forming step); forming second supporters (S19, a second supporter forming step); and laminating the second substrate having the second gas channels on the first substrate (S20, an assembling step).

(1) First Gas Channel Defining Step (S10)

Figure 4:
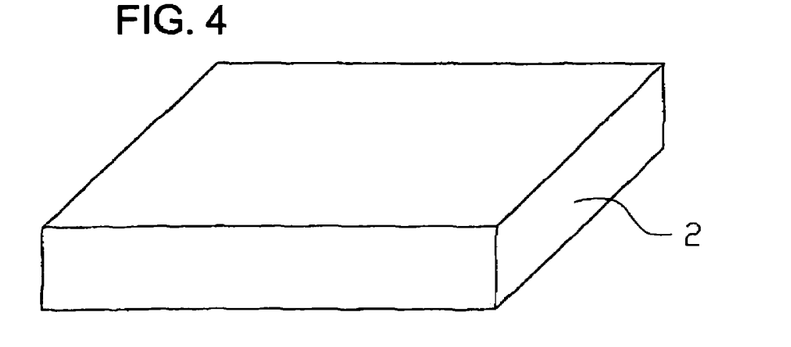
FIG. 4 is a perspective view of a substrate in a process of manufacturing a fuel cell according to this exemplary embodiment.

FIG. 4 shows a first substrate 2, which is a rectangular silicon substrate. The material for the first substrate 2 is not limited to silicon and may be alumina or another material normally used in fuel cells.

The belt conveyor BC1 conveys this first substrate 2 onto the table 28, which introduces the first substrate 2 into the discharger 20a.

The discharger 20a applies the gas channel defining material onto predetermined areas of the top surface of the first substrate 2 on the table 28 from the tank 30 through the nozzles on the nozzle-formed portion 26. As a result, the top surface of the first substrate 2 is coated with the gas channel defining material having a predetermined pattern. According to this exemplary embodiment, the discharger 20a can easily coat the first substrate 2 with the gas channel defining material having any pattern.

The gas channel defining material may be any material that can define the first gas channels on the first substrate 2. The present invention preferably uses synthetic resins, which have advantages such as high usability, strong adhesion to substrates, and low cost. Among synthetic resins, the present invention more preferably uses thermosetting resins or photocurable resins as the gas channel defining material for the fuel cell of the present invention. Thermosetting resins or photocurable resins, which are cured to form a three-dimensional network structure, excel in, for example, thermal resistance, chemical resistance, weather resistance, adhesion, wear resistance, waterproofness, mechanical strength, and hardness.

Thermosetting resins refer to those that are heated alone or in combination with, for example, a curing agent to be a cross-linked polymer, which is an infusible and insoluble material having a three-dimensional network structure.

Examples of thermosetting resins include phenol resins, urea resins, melamine resins, furan resins, epoxy resins, unsaturated polyester resins, silicone resins, polyurethane resins, diallyl phthalate resins, guanamine resins, and ketone resins. On the other hand, examples of the curing agent combined include aliphatic polyamines, amidoamines, polyamides, aromatic polyamines, acid anhydrides, Lewis bases, and polymercaptans.

Typical photocurable resins are composed of, for example, a photopolymerizable monomer or oligomer and a photoinitiator. A photocurable resin coating is irradiated with light to excite the photoinitiator, which generates, for example, radical molecules and hydrogen ions. These radical molecules and hydrogen ions react with reactive groups of the monomer or oligomer to cause three-dimensional polymerization and cross-linking reaction, so that the coating becomes cured.

Examples of the monomer include 2-ethylhexyl acrylate, 2-hydroxyethyl acrylate, neopentyl glycol diacrylate, and hexanediol diacrylate. On the other hand, the oligomer is a polymer (prepolymer) that has a double bond and in which the monomer is repeated about 2 to 20 times. Examples of the oligomer include polyester acrylate, epoxy acrylate, and urethane acrylate.

Examples of the photoinitiator include benzophenone compounds, such as benzophenone, benzoin compounds, such as benzoin isopropyl ether, acetophenone compounds such as acetophenone diethyl ketal, and thioxanthone compounds, such as chlorothioxanthone and isopropylthioxanthone.

If the gas channel defining material is a liquid, it may be directly used. If it is not a liquid, the gas channel defining material may be dissolved in a suitable solvent to form a solution or may be dispersed in a suitable dispersing medium to form a dispersion liquid. A thermosetting resin, for example, may be dissolved in an organic solvent or may be dispersed in an organic dispersing medium, if necessary, in combination with the curing agent to form a varnish. On the other hand, a photocurable resin, which is composed of, for example, the photopolymerizable monomer or oligomer and the photoinitiator, may be dissolved in an organic solvent to form a solution or may be dispersed in an organic dispersing medium to form a dispersion liquid.

The solvent or dispersing medium for the thermosetting resin or the photocurable resin is not particularly limited, and related art or known organic solvents or dispersing media may be used.

If necessary, a variety of additives, such as a stabilizer, a filler, a chain-transfer agent, a photosensitizer, and a cross-linking agent may be added to the varnish of the thermosetting resin or the solution or dispersion liquid of the photocurable resin to attain, for example, more stability and hardness.

Figure 5:
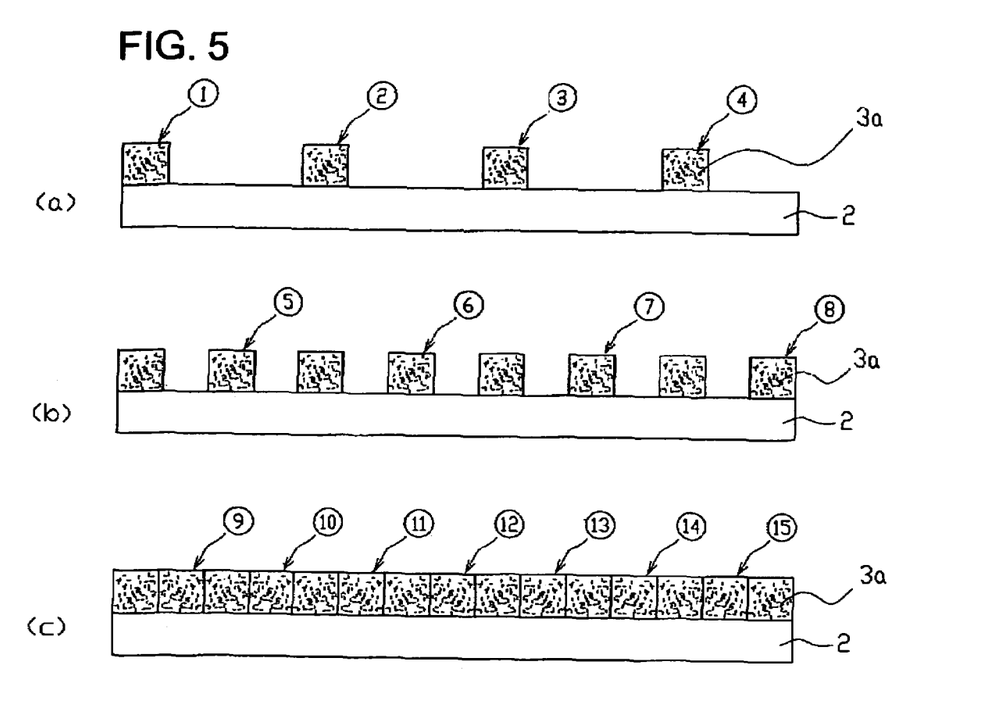
FIGS. 5(a)-5(c) are schematics that illustrate a step of defining gas channels according to this exemplary embodiment.

The discharger 20a preferably applies the gas channel defining material at regular intervals over the predetermined areas of the top surface of the first substrate 2. Referring to FIG. 5(a), the gas channel defining material is applied at regular intervals over the predetermined areas of the top surface of the first substrate 2. Referring to FIG. 5(b), the gas channel defining material is then applied at regular intervals into the gaps between the layer 3a made from droplets of the gas channel defining material applied on these areas. Referring to FIG. 5(c), the gas channel defining material is further applied at regular intervals into the gaps between the layers 3a made from the droplets of the gas channel defining material applied on these areas. These operations may be repeated to achieve uniform coatings, which, therefore, can provide gas channels having a uniform height along their whole length. In FIGS. 5(a), 5(b), and 5(c), circled numbers indicate the order in which the gas channel defining material is applied while 3a indicates a layer made from a droplet of gas channel defining material.

This method is analogous to making tea. Teas having uniform strength can be made by putting tea leaves into a teapot, pouring hot water into the teapot, and repeatedly pouring a small amount of tea into each cup at a time. Similarly, more uniform coatings, which provide fine gas channels having a uniform height along their whole length, can be formed by repeatedly applying the gas channel defining material at regular intervals than by sequentially applying the gas channel defining material in one direction. This is because the individual droplets of the gas channel defining material discharged by the discharger 20a have variable amounts and concentrations.

Thus, coatings of the gas channel defining material are formed by repeatedly applying the gas channel defining material at regular intervals over the predetermined areas of the top surface of the first substrate 2 using the discharger 20a. In the present invention, another gas channel defining material (a second gas channel defining material) is preferably applied over the top surfaces of the coatings of the gas channel defining material (a first gas channel defining material). The top surfaces of the coatings having microscopically nonuniform height which is formed by repeatedly applying the first gas channel defining material at regular intervals may be finished by applying the second gas channel defining material, which has a lower viscosity and a higher liquidity than the first gas channel defining material, to provide gas channels having a more uniform height along their whole length. The first gas channel defining material, if having a lower viscosity, may be used as the second gas channel defining material. The first gas channel defining material may be reduced in viscosity by, for example, decreasing the solid concentration of the first gas channel defining material (by increasing the content of solvent or dispersing medium).

When a thermosetting resin or a photocurable resin is used as the gas channel defining material, the coatings of the gas channel defining material formed by the discharger are cured by heating or light irradiation. The coatings may be heated or irradiated with light immediately after application or in the subsequent steps.

Thermosetting resin coatings may be cured by heating at a predetermined temperature using, for example, a heater. The heating temperature and time required to completely cure the thermosetting resin coatings may be determined according to the types of thermosetting resin and curing agent used. On the other hand, photocurable resin coatings may be cured by irradiation with light at a predetermined wavelength. Examples of the light used include ultraviolet light, visible light, and electron beams. In general, the light irradiation may be performed using lamps, such as high-pressure mercury vapor lamps and metal halide lamps. The photocurable resin coatings are irradiated until they are cured, generally, for several seconds or minutes.

Figure 6:
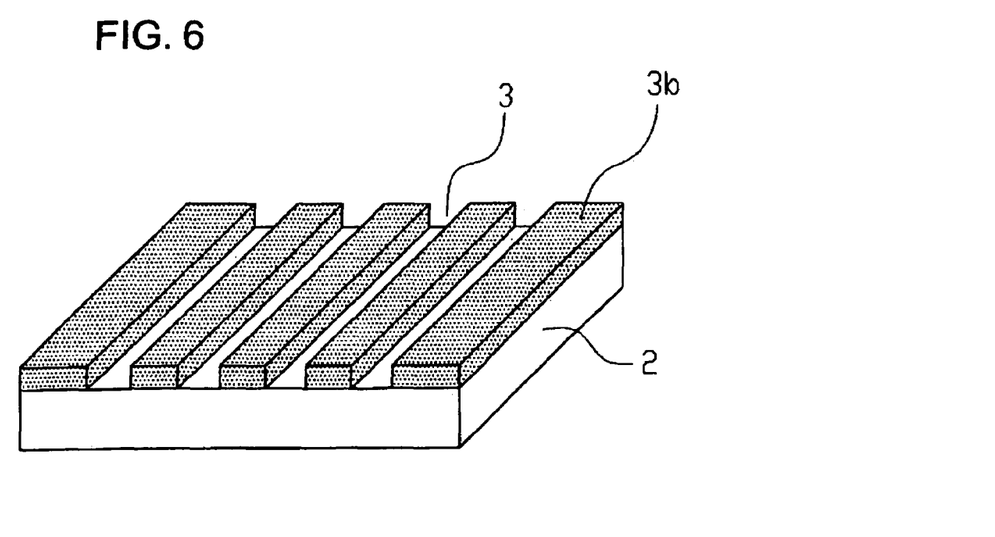
FIG. 6 is a schematic that illustrates the step of defining gas channels according to this exemplary embodiment.

The first gas channels are thus prepared. Referring to FIG. 6, first gas channels 3 are formed in the gaps between gas channel defining layers 3b, which are solidified (or cured) coatings of the gas channel defining material.

Figure 7:
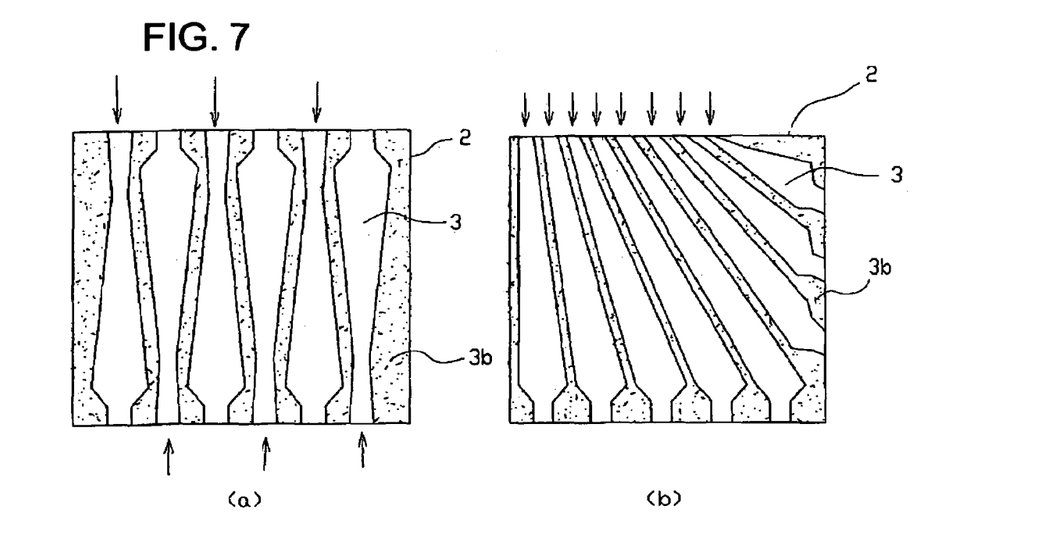
FIGS. 7(a) and 7(b) are schematics that show the top faces of gas channels having different patterns according to this exemplary embodiment.

In this exemplary embodiment, the first gas channels 3 have the same width and are parallel to one side of the first substrate 2. The first gas channels 3, however, may have, for example, any shape and width that allow the first reactive gas to flow through the first gas channels 3. For example, as shown in FIGS. 7(a) and 7(b), the width of the first gas channels 3 may increase continuously along the flow of the first reactive gas from upstream to downstream. In general, the concentration of the first reactive gas decreases as the gas flows through the first gas channels 3. If the width of the first gas channels 3 increases continuously along the flow of the first reactive gas from upstream to downstream, as shown in FIGS. 7(a) and 7(b), the flow rate of the first reactive gas increases along the flow of the first reactive gas. As a result, the first reacting layer can receive a constant flow rate of reactive gas, which can provide a stable output for a fuel cell. In FIGS. 7(a) and 7(b), arrows indicate supply ports for the first reactive gas.

Subsequently, the table 28 delivers the first substrate 2 having the gas channels 3 to the belt conveyor BC1, which conveys the first substrate 2 to the discharger 20b.

(2) First Supporter Forming Step (S11)

The first supporters are formed in the first gas channels 3 of the first substrate 2 to support the first current-collecting layer. First, the table 28 holds the first substrate 2 to introduce the first substrate 2 into the discharger 20b. The discharger 20b applies a first supporter forming material into the first gas channels 3 from the tank 30 through the nozzles on the nozzle-formed portion 26 to form the first supporters.

Figure 8:
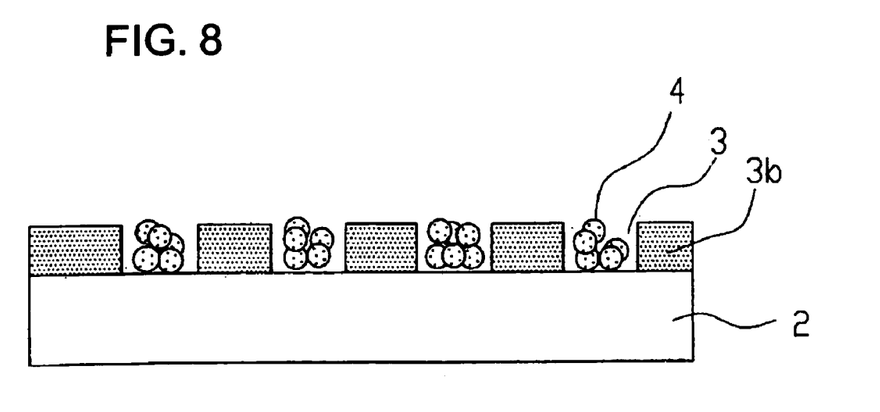
FIG. 8 is a schematic that shows an end face of the substrate in the process of manufacturing a fuel cell according to this exemplary embodiment.

The first supporter forming material may be any material that is inert to the first reactive gas, reduces or prevents the first current-collecting layer from falling into the first gas channels 3, and allows the first reactive gas to diffuse into the first reacting layer. Examples of the first supporter forming material include carbon particles and glass particles. This exemplary embodiment uses porous carbon having a particle diameter of about 1 to 5 μm as the first supporter forming material. The first supporters made of such porous carbon allow the first reactive gas flowing through the first gas channels 3 to diffuse upward through gaps in the porous carbon. The first supporters, therefore, do not prevent the flow of the first reactive gas. FIG. 8 shows an end face of the first substrate 2 having first supporters 4. The table 28 delivers the first substrate 2 having the first supporters 4 to the belt conveyor BC1, which conveys the first substrate 2 to the discharger 20c.

(3) First Current-Collecting Layer Forming Step (S12)

The first current-collecting layer, which collects electrons generated through the reaction of the first reactive gas, is formed on the first substrate 2. First, the belt conveyor BC1 conveys the first substrate 2 onto the table 28, which introduces the first substrate 2 into the discharger 20c. The discharger 20c applies a predetermined amount of current-collecting layer forming material onto the first substrate 2 from the tank 30 through the nozzles on the nozzle-formed portion 26 to form the first current-collecting layer having a predetermined pattern.

The current-collecting layer forming material may be any material that contains a conductive material. Examples of the conductive material include copper, silver, gold, platinum, and aluminum. These conductive materials may be used alone or in combination. The current-collecting layer forming material may be prepared by dispersing at least one of these conductive materials in a suitable dispersing medium, if necessary, using a dispersant.

This exemplary embodiment uses the discharger 20c to apply the current-collecting layer forming material. The discharger 20c can simply and accurately apply a predetermined amount of current-collecting layer forming material over predetermined areas. The discharger 20c, therefore, can largely save the consumption of the current-collecting layer forming material and efficiently form the first current-collecting layer having a predetermined pattern (shape). In addition, intervals for the application of the current-collecting layer forming material may be easily changed according to their positions to control the permeability of the first current-collecting layer. Furthermore, different current-collecting layer forming materials may be applied at different positions.

Figure 9:
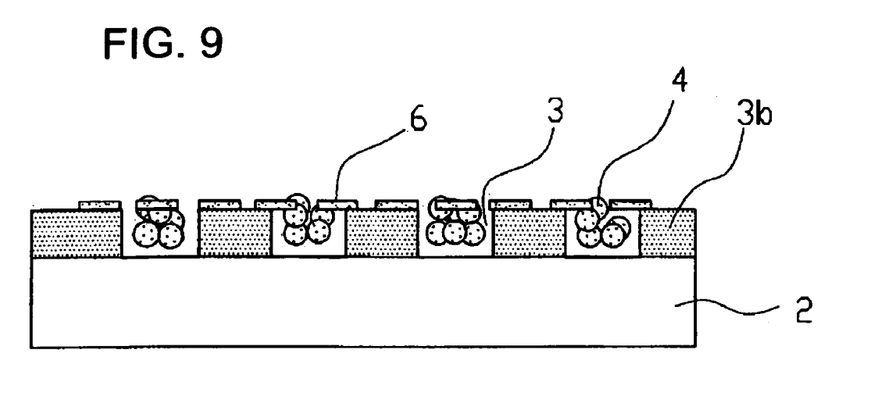
FIG. 9 is a schematic that shows the end face of the substrate in the process of manufacturing a fuel cell according to this exemplary embodiment.

FIG. 9 shows an end face of the first substrate 2 having a first current-collecting layer 6. As shown in FIG. 9, the first supporters 4 support the first current-collecting layer 6 so that the first current-collecting layer 6 does not fall into the first gas channels 3 defined on the first substrate 2. The table 28 delivers the first substrate 2 having the first current-collecting layer 6 to the belt conveyor BC1, which conveys the first substrate 2 to the discharger 20d.

(4) First Gas-Diffusing Layer Forming Step (S13)

The first gas-diffusing layer is formed on the first current-collecting layer 6 of the first substrate 2. First, the belt conveyor BC1 conveys the first substrate 2 onto the table 28, which introduces the first substrate 2 into the discharger 20d. The discharger 20d applies a gas-diffusing layer forming material over predetermined areas of the top surface of the first substrate 2 from the tank 30 through the nozzles on the nozzle-formed portion 26 to form the first gas-diffusing layer.

Examples of the gas-diffusing layer forming material include carbon microparticles, which are typically used, carbon nanotubes, carbon nanohorns, and fullerene. In this exemplary embodiment, the first gas-diffusing layer, which is formed using the discharger 20d, may have larger intervals between application (tens of micrometers) near the first current-collecting layer 6 and smaller intervals between application (tens of nanometers) near the top surface of the first gas-diffusing layer. The larger intervals between applications provide wider channels for the first reactive gas near the first substrate 2 to reduce or minimize the diffusion resistance of the first reactive gas. On the other hand, the smaller intervals between applications near the first reacting layer (near the top surface of the first gas-diffusing layer) provide uniform and fine channels for the first reactive gas. The first gas-diffusing layer may be made of carbon microparticles near the first substrate 2 and a material that poorly diffuses the first reactive gas and that excellently supports a catalyst near the top surface of the first gas-diffusing layer.

Figure 10:
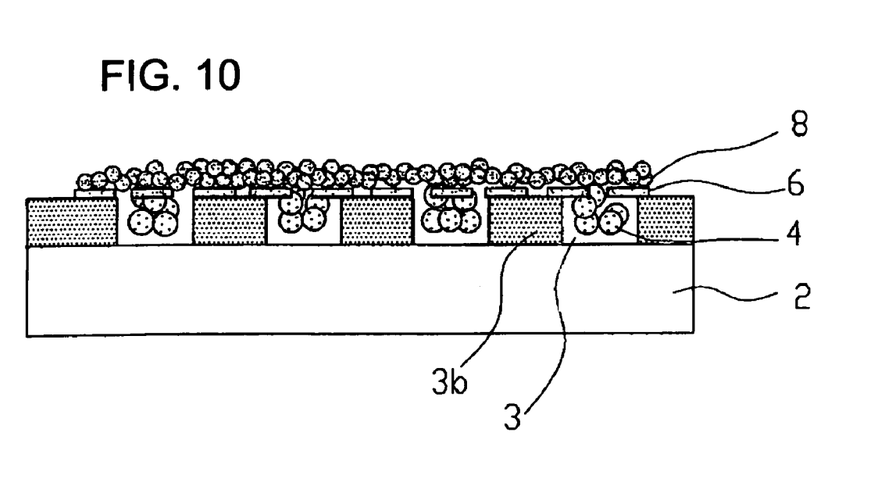
FIG. 10 is a schematic that shows the end face of the substrate in the process of manufacturing a fuel cell according to this exemplary embodiment.

FIG. 10 shows an end face of the first substrate 2 having a first gas-diffusing layer 8. As shown in FIG. 10, the first gas-diffusing layer 8 is formed entirely over the first substrate 2 so as to cover the first current-collecting layer 6 on the first substrate 2. The table 28 delivers the first substrate 2 having the first gas-diffusing layer 8 to the belt conveyor BC1, which conveys the first substrate 2 to the discharger 20e.

(5) First Reacting Layer Forming Step (S14)

The first reacting layer is formed on the first substrate 2 and electrically connected to the first current-collecting layer 6 through the first gas-diffusing layer 8.

First, the belt conveyor BC1 conveys the first substrate 2 onto the table 28, which introduces the first substrate 2 into the discharger 20e. While inert gas is allowed to flow through the first gas channels 3, the reacting layer forming material is applied on the first gas-diffusing layer 8 to form a first reacting layer 10. The discharger 20e applies a reacting layer forming material over predetermined areas of the top surface of the first substrate 2 from the tank 30 through the nozzles on the nozzle-formed portion 26. The reacting layer forming material applied is heated at a predetermined temperature to form the first reacting layer.

Examples of the reacting layer forming material include: a dispersion liquid (a) of a metallic compound or a metal hydroxide absorbed by a carbon carrier, and a dispersion liquid (b) of metal microparticles absorbed by a carbon carrier.

A method of preparing the dispersion liquid (a) is described below. First, an aqueous or aqueous alcoholic dispersion liquid of a metallic compound is prepared. If necessary, an alkali is added to the dispersion liquid to prepare a metal hydroxide. A carbon carrier such as carbon black is then added to the dispersion liquid, which is heated and mixed to allow the carbon carrier to absorb (deposit) the metallic compound or metal hydroxide, providing a crude metal-supported carbon. This crude metal-supported carbon is properly repeatedly filtered out, washed, and dried to refine the crude metal-supported carbon. The refined metal-supported carbon is dispersed in water or an aqueous alcoholic dispersing medium to provide the dispersion liquid (a). Examples of the metallic compound include precious metal salts, such as platinum salts and gold salts.

On the other hand, the dispersion liquid (b) may be prepared by adding a carbon carrier to a dispersion liquid of metal microparticles with an organic dispersant. The metal microparticles may be of any metal that can catalyze the first and second reactive gases. Examples of the metal microparticles include microparticles of one or more kinds of metals including platinum, rhodium, ruthenium, iridium, palladium, osmium, and alloys of at least two of these metals. Among them, platinum microparticles are particularly preferred for the dispersion liquid (b). The particle diameter of the metal microparticles, though not being particularly limited, ranges normally from 1 to 100 nanometers, preferably from several to tens of nanometers. The organic dispersant may be any one that can uniformly disperse the metal microparticles in the dispersion liquid. Examples of the organic dispersant include alcohols, ketones, esters, ethers, and aliphatic, alicyclic, and aromatic hydrocarbons.

If the dispersion liquid (a) is used as the reacting layer forming material to form a coating, the coating is dried, reduced with, for example, hydrogen gas, and heated to form the first reacting layer. On the other hand, if the dispersion liquid (b) is used as the reacting layer forming material to form a coating, the coating is heated to remove the organic dispersant and the dispersing medium, providing the first reacting layer. This coating may be fired at 200° C. to 300° C. in an atmosphere of an inert gas, such as nitrogen gas to provide the first reacting layer. Then, the organic dispersant is sintered to form carbon microparticles, which adhere to the metal microparticles in the first reacting layer.

Figure 11:
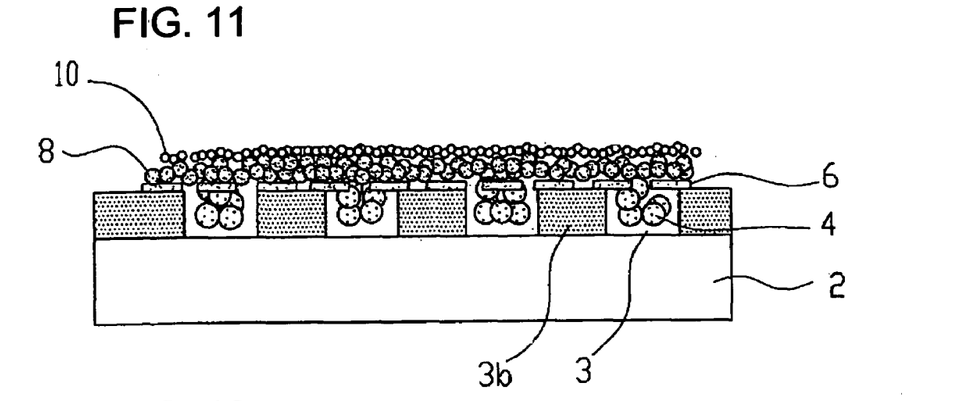
FIG. 11 is a schematic that shows the state in which a coating of a dispersion liquid has been formed and a reacting layer is to be formed.

FIG. 11 shows an end face of the first substrate 2 having the first reacting layer 10. The table 28 delivers the first substrate 2 having the first reacting layer 10 to the belt conveyor BC1, which conveys the first substrate 2 to the discharger 20*f*.

(6) Electrolyte Membrane Forming Step (S15)

The electrolyte membrane is formed on the first reacting layer 10 of the first substrate 2. First, the belt conveyor BC1 conveys the first substrate 2 onto the table 28, which introduces the first substrate 2 into the discharger 20*f*. The discharger 20*f* applies an electrolyte membrane forming material onto the first reacting layer 10 from the tank 30 through the nozzles on the nozzle-formed portion 26 to form an electrolyte membrane 12.

An example of the electrolyte membrane forming material is a ceramic solid electrolyte, such as tungstophosphoric acid and molybdophosphoric acid, having a predetermined viscosity (for example, 20 cP or less). Another example is a polyelectrolyte, such as Nafion® (made by DuPont), provided through the micellisation of perfluorosulfonic acid in a mixed solution of water and methanol in the weight ratio of 1:1.

Figure 12:
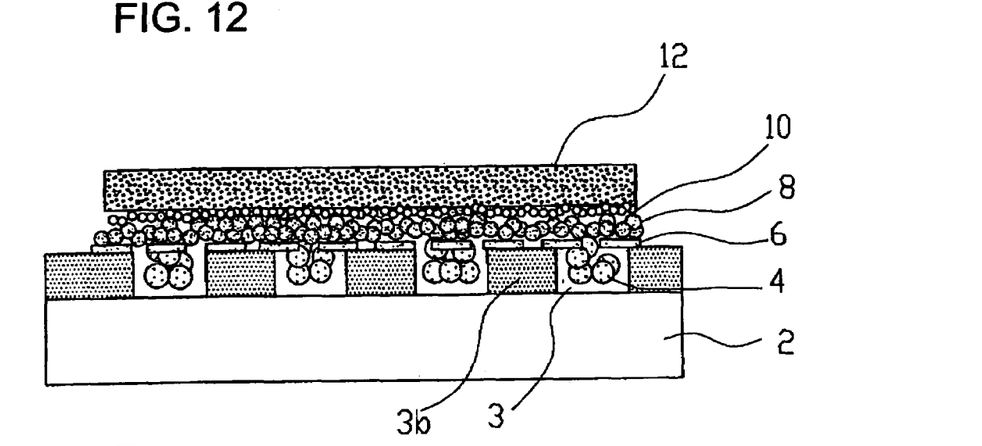
FIG. 12 is a schematic that shows the end face of the substrate in the process of manufacturing a fuel cell according to this exemplary embodiment.

FIG. 12 shows an end face of the first substrate 2 having the first reacting layer 10 on which the electrolyte membrane 12 with a predetermined thickness is formed. The table 28 delivers the first substrate 2 having the electrolyte membrane 12 to the belt conveyor BC1, which conveys the first substrate 2 to the discharger 20*g*.

(7) Second Reacting Layer Forming Step (S16)

The second reacting layer is formed on the electrolyte membrane 12 of the first substrate 2. First, the belt conveyor BC1 conveys the first substrate 2 onto the table 28, which introduces the first substrate 2 into the discharger 20*g*. In the discharger 20*g*, the second reacting layer is formed through the same process as in the discharger 20*e*. A second reacting layer forming material may also be the same as the first reacting layer forming material.

Figure 13:
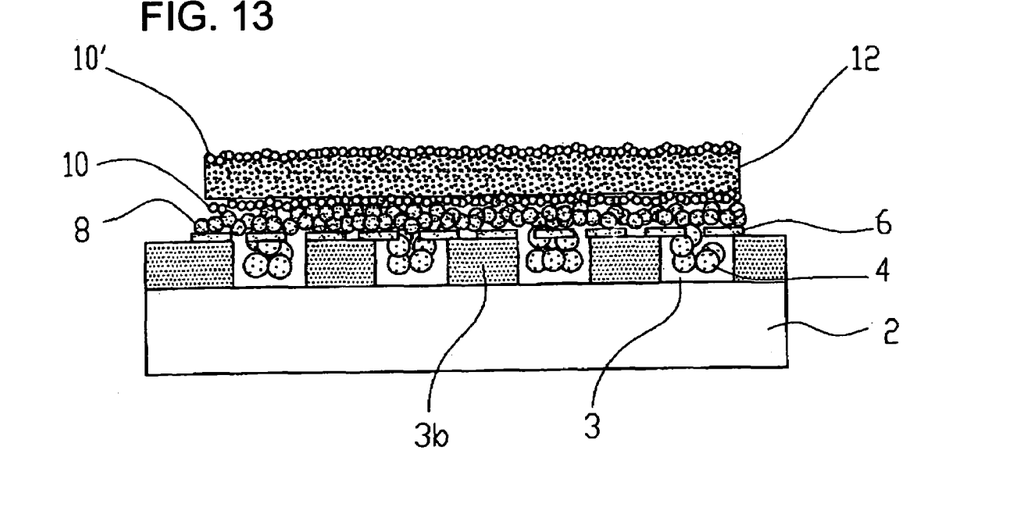
FIG. 13 is a schematic that shows the end face of the substrate in the process of manufacturing a fuel cell according to this exemplary embodiment.

FIG. 13 shows an end face of the first substrate 2 having the electrolyte membrane 12 on which a second reacting layer 10' is formed. This second reacting layer 10' catalyzes the second reactive gas. If, for example, the second reactive gas is oxygen gas, the reaction $\frac{1}{2}O_2 + 2H^+ + 2e^- \rightarrow H_2O$ occurs in the second reacting layer 10'. The table 28 delivers the first substrate 2 having the second reacting layer 10' to the belt conveyor BC1, which conveys the first substrate 2 to the discharger 20*h*.

(8) Second Gas-Diffusing Layer Forming Step (S17)

The second gas-diffusing layer is formed on the second reacting layer 10' of the first substrate 2. First, the belt conveyor BC1 conveys the first substrate 2 onto the table 28, which introduces the first substrate 2 into the discharger 20*h*. In the discharger 20*h*, the second gas-diffusing layer is formed through the same process as in the discharger 20*d*. A second gas-diffusing layer forming material may also be the same as the first gas-diffusing layer forming material.

Figure 14:
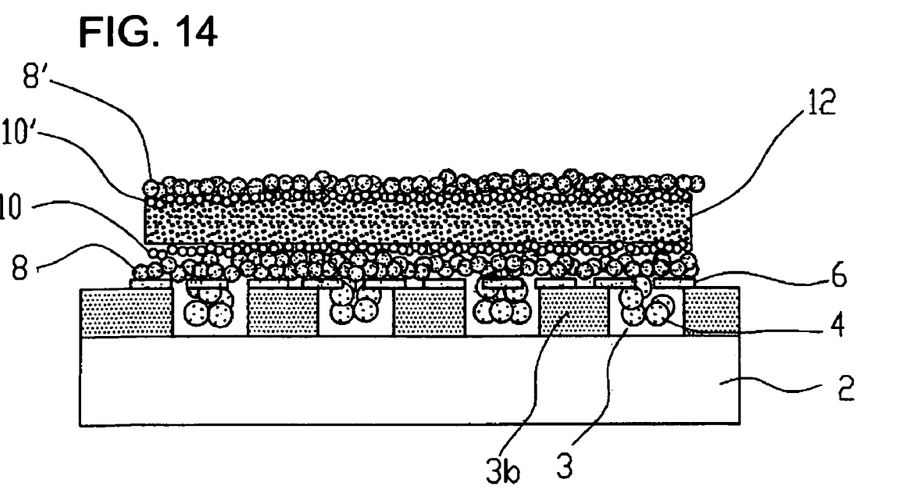
FIG. 14 is a schematic that shows the end face of the substrate in the process of manufacturing a fuel cell according to this exemplary embodiment.

FIG. 14 shows an end face of the first substrate 2 having a second gas-diffusing layer 8'. The table 28 delivers the first substrate 2 having the second gas-diffusing layer 8' to the belt conveyor BC1, which conveys the first substrate 2 to the discharger 20*i*.

(9) Second Current-Collecting Layer Forming Step (S18)

The second current-collecting layer is formed on the second gas-diffusing layer 8' of the first substrate 2. First, the belt conveyor BC1 conveys the first substrate 2 onto the table 28, which introduces the first substrate 2 into the discharger 20*i*. In the discharger 20*i*, the second current-collecting layer 6' is formed on the second gas-diffusing layer 8' through the same process as in the discharger 20*c*. A second current-collecting layer forming material may also be the same as the first current-collecting layer forming material. The table 28 delivers the first substrate 2 having the second current-collecting layer 6' to the belt conveyor BC1, which conveys the first substrate 2 to the discharger 20*j*.

(10) Second Supporter Forming Step (S19)

Next, the belt conveyor BC1 conveys the first substrate 2 onto the table 28, which introduces the first substrate 2 into the discharger 20*j*. In the discharger 20*j*, the second supporters are formed through the same process as in the discharger 20*b*. A second supporter forming material may also be the same as the first supporter forming material.

Figure 15:
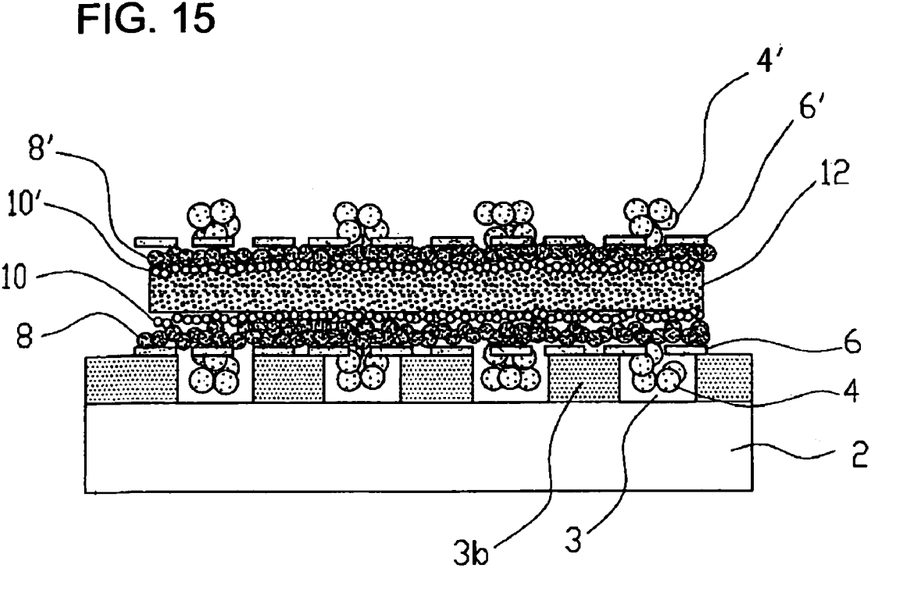
FIG. 15 is a schematic that shows the end face of the substrate in the process of manufacturing a fuel cell according to this exemplary embodiment.

FIG. 15 shows an end face of the first substrate 2 having a second current-collecting layer 6' and second supporters 4'. On the second current-collecting layer 6', the second supporters 4' are positioned such that the second supporters 4' can be accommodated in the second gas channels defined on the second substrate for lamination with the first substrate 2.

(11) Assembling Step (S20)

The first substrate 2 having the second supporters 4' is laminated with the second substrate having the second gas channels 3' such that the second gas channels 3' accommodate the second supporters 4'.

The second substrate may be the same as the first substrate 2. In the discharger 20*k*, the second gas channels are defined through the same process as in the discharger 20*a*.

Figure 16:
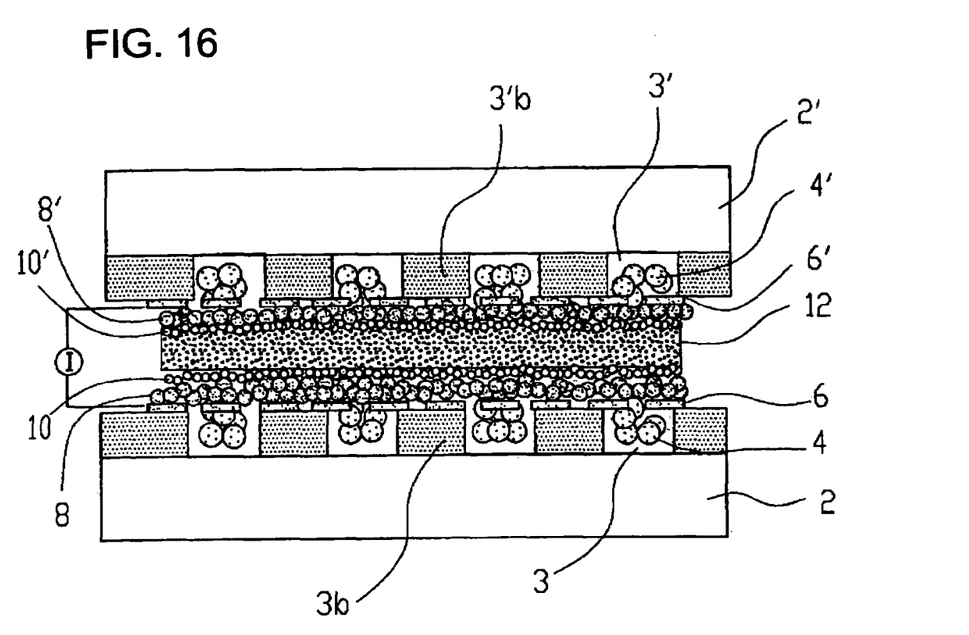
FIG. 16 is a schematic that shows the end face of the substrate in the process of manufacturing a fuel cell according to this exemplary embodiment.

Through the above steps, a fuel cell having a structure shown in FIG. 16 may be manufactured. This fuel cell includes the first substrate 2 and a second substrate 2' laminated such that the first gas channels 3, which are U-shaped and extend from one side to another side of the first substrate 2, are parallel to second gas channels 3' defined on the second substrate 2'.

According to this exemplary embodiment, a gas channel defining material may be applied onto a substrate with a discharger to define gas channels having desired patterns easily. The manufacturing method of this exemplary embodiment is particularly preferred to define gas channels having a fine structure on the substrate.

According to this exemplary embodiment, the discharger may repeatedly apply the gas channel defining material onto the substrate at regular intervals, thus easily defining gas channels having a uniform height along their whole length.

According to this exemplary embodiment, the gas channels are defined on the top surface of the substrate. The substrate, therefore, may be thin and made of various materials, such as metals, silicon, synthetic resins, and ceramics.

Furthermore, according to this exemplary embodiment, dischargers are used in the defining of the first gas channels; forming the first current-collecting layer; forming the first reacting layer; forming the electrolyte membrane; defining the second gas channels; forming the second current-collecting layer; and forming the second reacting layer. This exemplary embodiment, therefore, does not require MEMSs for semiconductor processes and provides a low-cost method for manufacturing a fuel cell.

The method of manufacturing a fuel cell in this exemplary embodiment uses the dischargers in all steps. In this manufacturing method, while the dischargers are used in the defining of the gas channels on the substrates, the other steps may be the same as in related art or known methods of manufacturing a fuel cell. Such a modification also does not require MEMSs to form the reacting layers, so that the method can provide a fuel cell at low cost.

In the manufacturing method of this exemplary embodiment, the individual components are sequentially formed on the first substrate. This first substrate, which receives the first reactive gas, is finally laminated with the second substrate, which receives the second reactive gas, to manufacture a fuel cell. The components may be sequentially formed on the second substrate.

In the manufacturing method of this exemplary embodiment, the second supporters are formed along the first gas channels on the first substrate. The second supporters may be formed across the first gas channels on the first substrate. That is, for example, the second supporters may be perpendicular to the first gas channels on the first substrate. Such a modification provides a fuel cell in which the second gas channels of the second substrate are perpendicular to the first gas channels of the first substrate.

In the manufacturing method of this exemplary embodiment, the first current-collecting layer, the first reacting layer, the electrolyte membrane, the second reacting layer, and the second current-collecting layer are sequentially formed on the first substrate having the first gas channels. A current-collecting layer, a reacting layer, and an electrolyte membrane may be formed on each of the first substrate and the second substrate before the lamination of the first substrate and the second substrate.

As an another aspect of a fuel cell manufacturing line in this exemplary embodiment, two manufacturing lines may be used: a first manufacturing line for the first substrate and a second manufacturing line for the second substrate. In this exemplary modification, the first and second substrates can be processed in parallel to manufacture a fuel cell more quickly.

The electronic device of the present invention includes the fuel cell described above as a power supply. Examples of the electronic device include: cell phones, personal handyphone system (PHS) phones, mobile notebook PCs, personal digital assistants (PDAs), and mobile TV phones, for example, the electronic device of the present invention may have other functions, such as games, data communications, record/playback, and dictionaries.

The electronic device of the present invention, therefore, can use environmentally friendly clean energy as a power supply.

Figure 17:
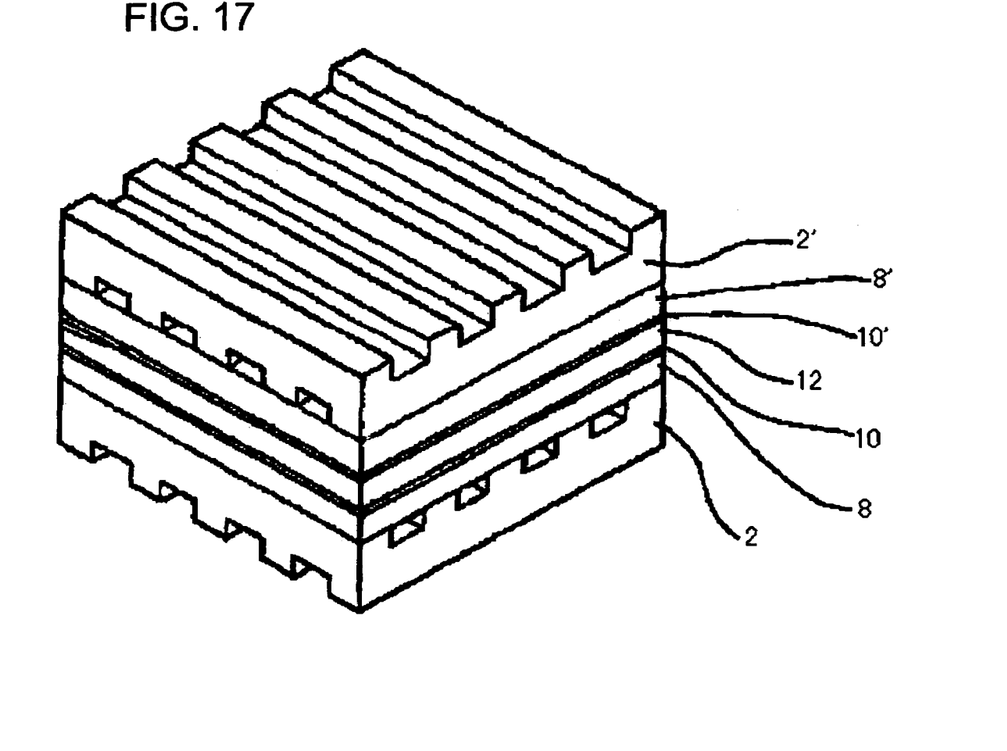
FIG. 17 is a schematic that shows a large fuel cell composed of a plurality of fuel cells according to this exemplary embodiment.

The automobile of the present invention includes the fuel cell described above as a power supply. According to the manufacturing method of the present invention, a plurality of fuel cells may be laminated to manufacture a large fuel cell. Referring to FIG. 17, through the steps of the manufacturing method described above, additional components, such as gas channels, gas-diffusing layers, reacting layers, and a electrolyte membrane, may be formed on the reverse surface of the second substrate 2' of the fuel cell to manufacture a large fuel cell.

The automobile of the present invention, therefore, can use environmentally friendly clean energy as a power supply.

What is claimed is:

1. A method of manufacturing a fuel cell, comprising:
    defining first gas channels to supply a first reactive gas on a first substrate;
    forming a first current-collecting layer to collect electrons generated through a reaction of the first reactive gas supplied through the first gas channels;
    forming a first reacting layer to catalyze the first reactive gas supplied through the first gas channels;
    forming an electrolyte membrane;
    defining second gas channels to supply a second reactive gas on a second substrate;
    forming a second current-collecting layer to supply the electrons for a reaction of the second reactive gas supplied through the second gas channels;
    forming a second reacting layer to catalyze the second reactive gas supplied through the second gas channels; and
    defining, in at least one of the defining of the first gas channels and the defining of the second gas channels, the gas channels by gas channel defining layers made of coatings formed by applying a first gas channel defining material onto at least one of the first substrate and the second substrate using a discharger, the discharger dispersing the first gas channel defining material as liquid droplets.

2. The method of manufacturing a fuel cell according to claim 1, further including forming, in at least one of the defining of the first gas channels and the defining of the second gas channels, the coatings by repeatedly applying the first gas channel defining material using the discharger at regular intervals over areas onto which the gas channel defining layers are formed.

3. The method of manufacturing a fuel cell according to claim 1, further including, in at least one of the defining of the first gas channels and the defining of the second gas channels:
    forming the coatings by repeatedly applying the first gas channel defining material using the discharger at regular intervals over areas onto which the gas channel defining layers are formed, and
    further coating the coatings with a second gas channel defining material having a lower viscosity than the first gas channel defining material.

4. The method of manufacturing a fuel cell according to claim 1, further including using at least one of a thermosetting resin and a photocurable resin as at least one of the first gas channel defining material and a second gas channel defining material.

* * * * *